United States Patent [19]

White

[11] 4,174,528
[45] Nov. 13, 1979

[54] EXPOSURE CONTROL FOR DOCUMENT SCANNER ARRAYS

[75] Inventor: James M. White, Mahopac, N.Y.

[73] Assignee: International Business Machines Corporation, Armonk, N.Y.

[21] Appl. No.: 920,942

[22] Filed: Jun. 30, 1978

[51] Int. Cl.$^2$ .................. H04N 1/40; H04N 1/10; H04N 1/24; H04N 3/14
[52] U.S. Cl. ................... 358/280; 358/213; 358/293; 358/294; 358/282
[58] Field of Search ............ 358/160, 213, 280, 293, 358/294, 282

[56] References Cited

U.S. PATENT DOCUMENTS

| | | | |
|---|---|---|---|
| 3,697,683 | 10/1972 | Gates | 358/280 |
| 3,800,079 | 3/1974 | McNeil | 358/160 |
| 3,867,569 | 2/1975 | Watson | 358/294 |
| 3,952,144 | 4/1976 | Kolker | 358/280 |
| 4,001,500 | 1/1977 | Lavery | 358/282 |
| 4,070,696 | 1/1978 | Mitchell | 358/280 |
| 4,133,008 | 1/1979 | Tisue | 358/282 |

Primary Examiner—Howard W. Britton
Attorney, Agent, or Firm—Jack M. Arnold

[57] ABSTRACT

A document scanner array which includes means for compensating for temporal changes in a light source, filters in the optical path, changes in the lens aperture and the like. The scanner array is comprised of a charge transfer device chip, which includes an exposure control section and a document information receiving section. A document holding means includes a reference indicia, with a reflection of the image of the reference indicia being imaged on the exposure control section simultaneous with the reflection of the document being imaged on the document information receiving section, in response to illumination from the light source. A common control signal concurrently applied to each section determines the time the reflected images are processed. The common control signal is terminated in response to the exposure control section sensing a given amount of light from the reflected image of the reference indicia.

12 Claims, 16 Drawing Figures

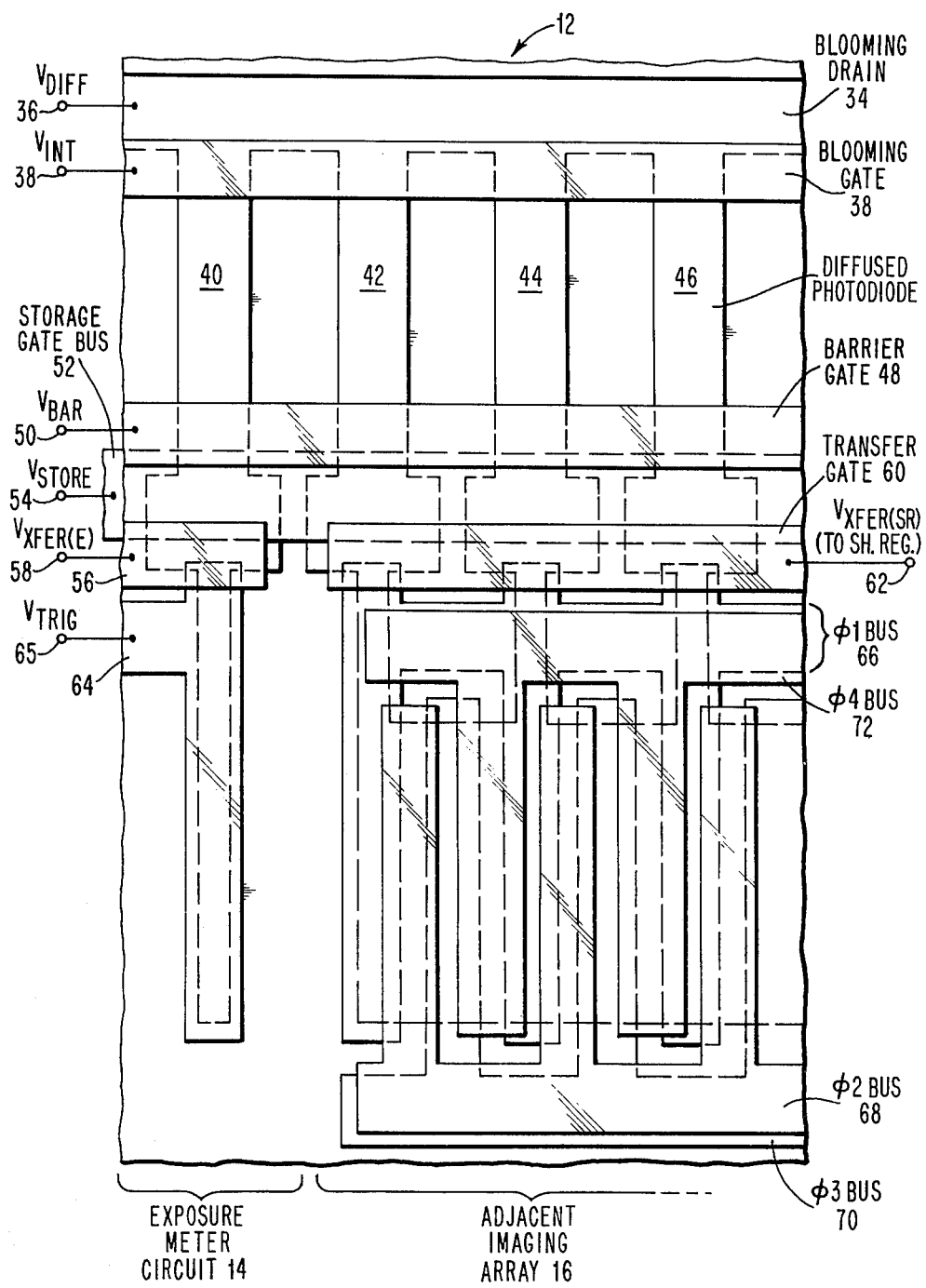

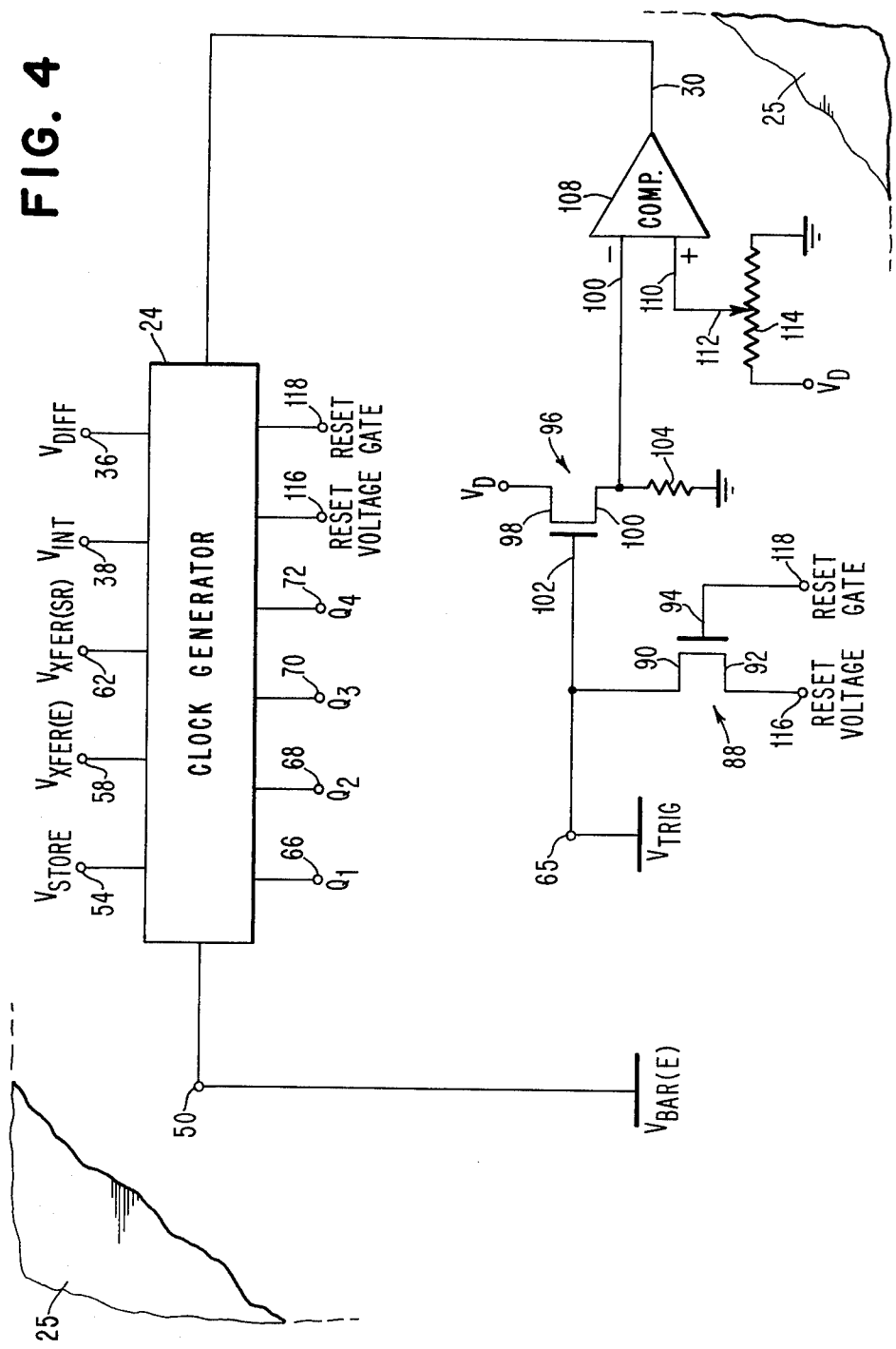

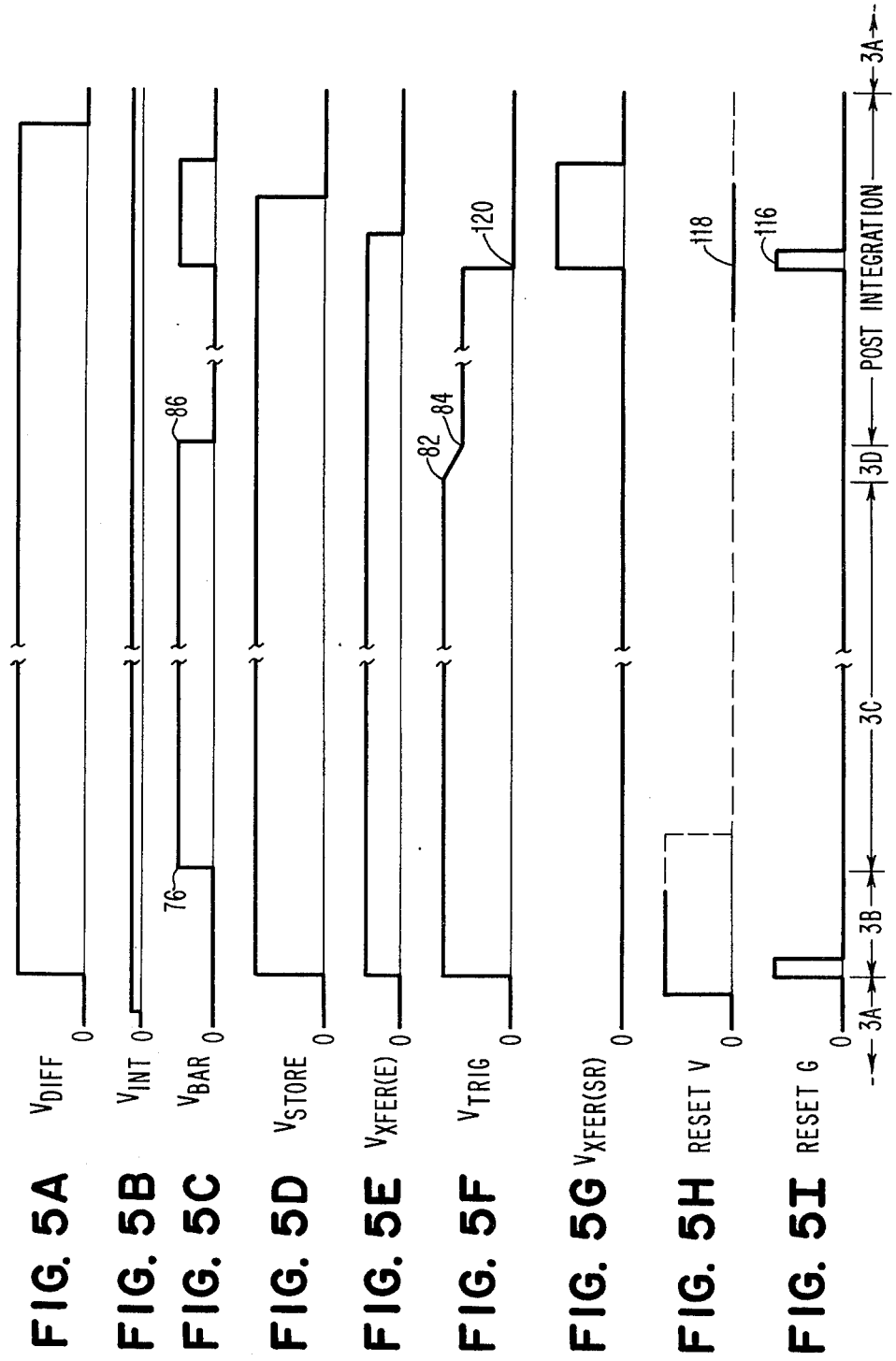

EXPOSURE CONTROL FOR DOCUMENT SCANNER ARRAYS

DESCRIPTION

Technical Field

The present invention is directed to exposure control for a document scanner array, and in particular a scanner array comprised of charge transfer devices which is illuminated by a source of temporally varying intensity such as an alternating current (AC) fluorescent lamp. The exposure control is accomplished on a line by line basis with the exposure control being performed on the same scanner chip as the document imaging. Fluorescent lamps provide a very efficient and relatively inexpensive source of light with a controllable spectral distribution that is desirable to fascimile scanner systems and other document readers. The high sensitivity and photo current integration capabilities of charge transfer devices, for example, charge couple devices (CCD's) makes possible the use of fluorescent lamps, which have low power requirements as well as other desireable features. However, the ripple in output of AC fluorescent lamps and the aging characteristics of most lamps require some means of automatically measuring the exposure, that is the integrated light output, and controlling the CCD integration time to compensate for such variations. The scanner array of the present invention accomplishes the exposure measurement by having the exposure element situated on the scanner chip near the end of the photo element array. A reference indicia such as a white stripe or material is placed on the edge of the document plate in the scanner system. The lenses and other optics used to image the document onto the photo element array also image the white stripe onto the exposure metering circuit. Because the exposure metering circuit sees the same optical path of the photo element array, including filters, fluctuation and aging of light source, and accordingly, compensations for these changes is automatic.

The exposure metering network on the scanner chip with the photo element array has the same fabrication process parameters as the photo elements in the scanner array itself and provide a spectral response match so that appropriate exposure metering occurs even if various colors of filters are used in the optical system. It is assumed that the white reference indicia has a high reflectivity for all spectral components of interest.

Once the desired exposure level of the metering circuit is reached, the charge in the photo element array is transferred into adjacent shift register channels and shifted to the output point.

BACKGROUND ART

There are a number of scanning systems known in the art, which utilize fluorescent tubes as an illumination source plus a CCD image scanner. One such scanning device is set forth in U.S. Pat. No. 3,867,569 to Watson which discloses a compact flatbed page scanner for a fascimile transmission system. The disclosed scanner utilizes a linear charge coupled imaging device for both light detection and electronic scanning across the width of the page, with the scanner system being illuminated by a fluorescent tube. There is no teaching in the Watson patent, however, relative to the use of an exposure controlled network, let alone an exposure controlled network fabricated on the scanner array itself.

U.S. Pat. No. 3,952,144 to Kolker discloses a method and apparatus for automatic background and contrast control in a fascimile scanning system. The fascimile transmitter makes a preliminary calibrating scan in which it sequentially scans a known reference indicia, for example, a black area and a white area, and the automatic background and contrast control unit fully automatically stores a first sample of the uncorrected video signal when the known black area is being scanned and stores a second sample of the uncorrected video signal when the known white area is being scanned. During subsequent scanning and transmission of the document, the automatic background and contrast control unit continually produces voltages representing the previously stored black and white samples and uses these voltages to continuously correct the video signals received during the subsequent scanning of the document. The Kolker patent teaches the use of a reference indicia, such as a black and white calibration strip, for exposure control units in which an electronic representation of the black and white samples is stored prior to the scanning of the document itself, with the stored reference values subsequently being used to correct for background variations during the subsequent scan of the document. There is, however, no teaching in the Kolker patent of the use of a CCD imaging system in which the exposure control is accomplished in the scanner chip itself, on a line by line basis concurrent with the scanning of the document.

U.S. Pat. No. 3,800,079 to McNeil et al discloses a compensation network for a scanning system, wherein a sensitivity profile of photo diodes forming a self scanned photo diode array operating in the charged storage mode is obtained as the array scans a standard background or white level while in a nonoperational or write mode. The serial output of the photo diode array is integrated and a predetermined gray level is subtracted to limit the resultant signal to the range affected by photo diode sensitivity variations and illumination non-uniformities. The resultant signal is digitized and stored under control of a write control signal. Compensation subsequently takes place in an operational mode. The stored digital signals are converted to an analog signal and the gray level is added thereto to correct the serial video information during an operating mode. The McNeil et al patent discloses a system somewhat similar to the Kolker patent, in which a background level is initially scanned and then stored and is subsequently used as a reference level as the document itself is scanned. Again, there is no mention of a charged transfer device array, let alone a line by line, concurrent exposure control correction of the scanned document by a reference network.

According to the present invention, a document scanner array is disclosed which compensates for temporal changes in a light source and other elements in the optical path, on a line by line basis through the use of a reference indicia which is scanned concurrent with the scanning of the document, rather than first scanning a reference indicia, storing a signal indicative thereof and then using the stored signal to modify the subsequently generated signals during the scanning of the document itself.

DISCLOSURE OF THE INVENTION

According to the present invention, a document scanner is described. There is means for supporting the document; a reference indicia; and means for illuminating the document and the reference indicia. There is also means for imaging the reference indicia and the document into first and second optical paths, respectively. A scanner array includes a first section in alignment with the first optical path for sensing the reflected image from the reference indicia, and a second section in alignment with the second optical path for sensing the reflected image, with the first section controlling the time the second section processes the reflected image of the document, in response to sensing a given amount of illumination from the reflected image of the reference indicia.

BRIEF DESCRIPTION OF THE DRAWINGS

FIG. 2 is a plan view of a scanner chip, including exposure control, which may be used in the document scanner system set forth in FIG. 1;

FIG. 4 is a schematic diagram of the timing section of the system, including selected gate electrodes of the charge transfer device illustrated in FIGS. 2 and 3; and FIGS. 5A-5I are timing diagrams which are useful in understanding the operation of the networks illustrated in FIGS. 3 and 4.

BEST MODE OF CARRYING OUT THE INVENTION

Figure 1:
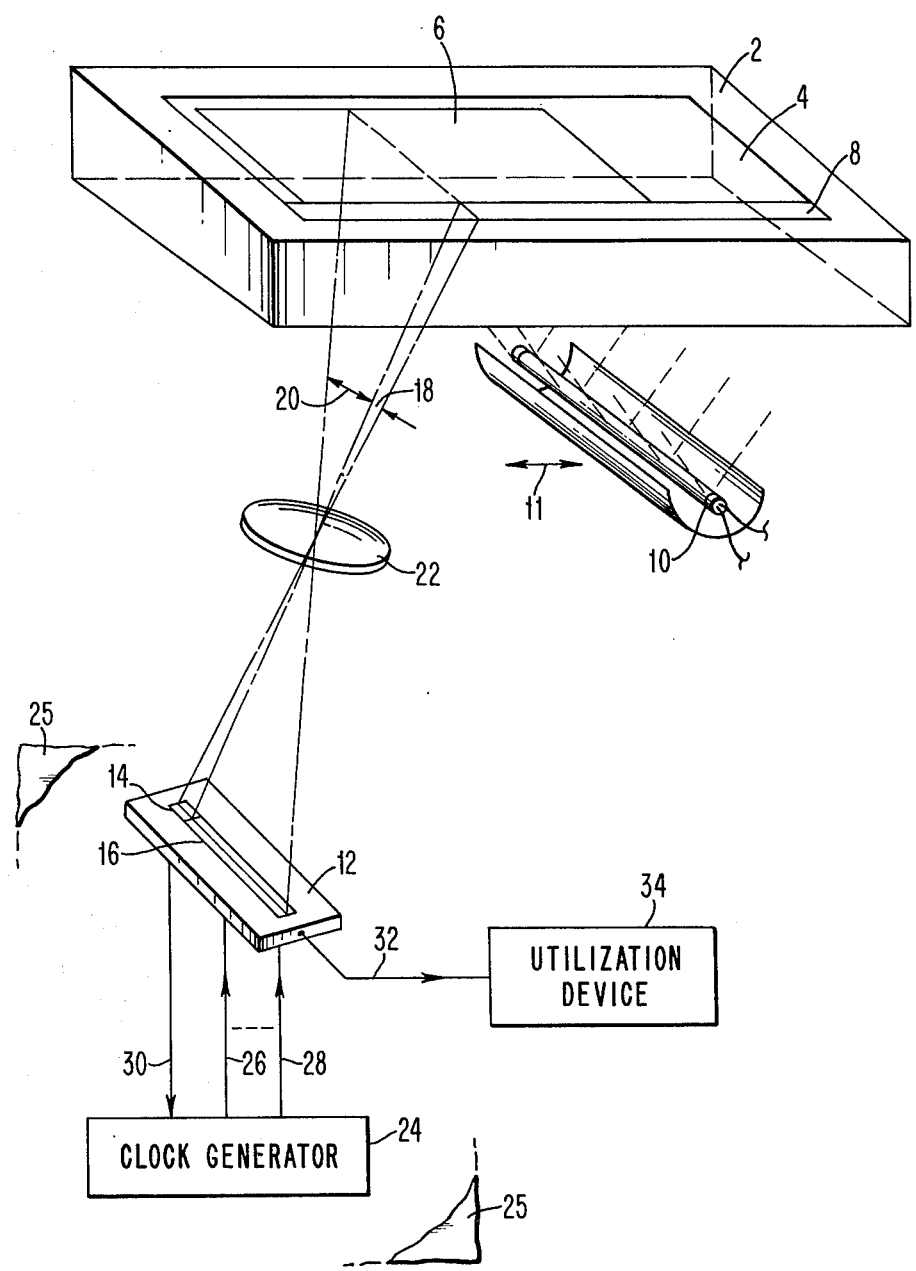
FIG. 1 is a schematic diagram of a document scanner system.
Figure 3A:
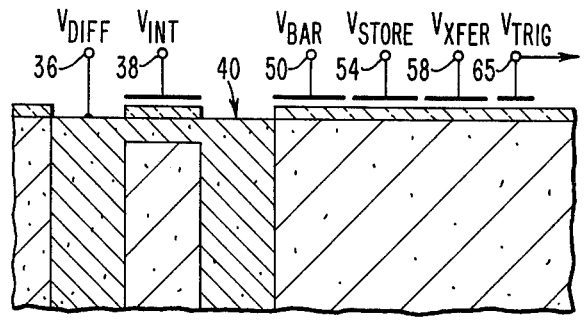
FIGS. 3A-3D are schematic diagrams of a multigate charge transfer device, illustrating surface potentials, which functions as the exposure control section of the scanner chip illustrated in FIGS. 1 & 2.
Figure 3B:
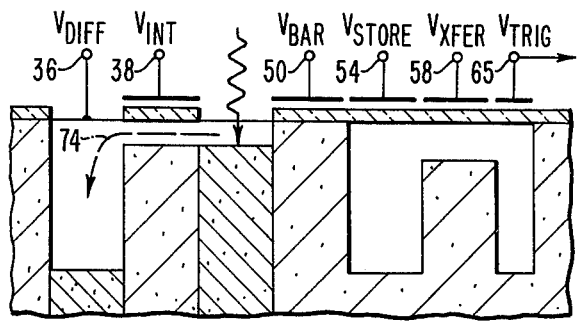
Figure 3C:
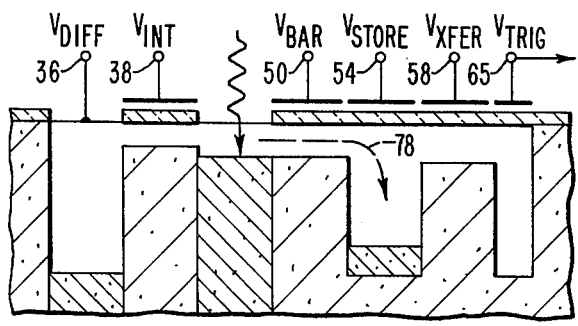
Figure 3D:
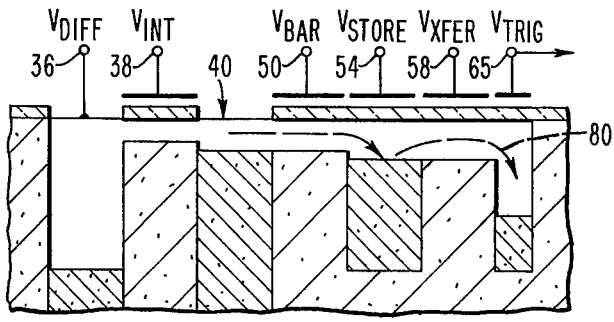

According to the present invention, there is described an exposure control network for a document scanner array. A document support plate 2 includes a transparent section 4 upon which a document 6 is situated. A reference indicia, such as a white stripe 8 is situated on the edge of the transparent section 4. Alternatively, the reference indicia 8 may be replaced by sensing the edge of the document 6 as a white reference indicia. A source of illumination, such as a fluorescent light 10 illuminates the document 6 by being moved back and forth in the direction of the arrow 11, by a bidirectional drive mechanism such as a motor or the like (not shown). A scanner array 12 is comprised of a photo element array comprised of charged coupled devices or bucket brigade devices, and includes a first section, such as an exposure control section 14 and a second section, such as a document information receiving section 16. The image from the reference indicia 8 is imaged into a first optical path 18 onto the exposure control section 14 via a lens 22, with the image of the document 6 being imaged into a second optical path 20 via the lens 22 onto the document information receiving section 16. A clock generator 24 provides a plurality of control signals via the lines 26 through 28 to the scanner array 12 for controlling the operation thereof. The scanner array 12 and the clock generator 24 may be formed on a single chip 25, or may be discrete devices. When the exposure control section 14 has sensed a predetermined amount of illumination, a control signal is provided via the line 30 to the clock generator 34 as an indication that the integration time for the exposure control section 14 as well as the document information receiving section 16 is completed, and a selected one of the control signals on the lines 26 through 28 are terminated such that the integration cycle for at least a given line on the document is completed. This mode of operation continues as at least a line at a time is scanned on the document 6. An output signal is provided on a line 32 to a utilization device 34, which is indicative of the character information appearing on a given line at a time on the document 6, with the utilization device 34 responding to the input on the line 32 for reproducing each line at a time which is imaged from the document 6 onto the scanner array 12.

FIG. 2 is a plan view of the imager or scanner array 12, which is illustrated generally in FIG. 1. As stated with reference to FIG. 1, the scanner array 12 includes an exposure meter circuit 14 and a document information receiving section 16. The fabrication of this scanner chip comprised of charge transfer devices such as charge coupled devices (CCD's) will not be described, as it is well known to those skilled in the art and can be readily ascertained from the figure. For example, such fabrication techniques for constructing a four phase CCD device is set forth in "Charge Transfer Devices" by Carlo H. Sequin & Michael F. Thompsett, Academic Press, Inc. 1975 at FIG. 3.2 and pages 23-25 in particular. The scanner array 12 has a blooming drain 34, which receives an input potential Vdiff at a terminal 36, and a blooming gate 38 which receives an input potential Vint at a terminal 38. A diffused photo diode 40 is formed in the exposure meter circuit 14 for sensing the radiant energy from the reference indicia. Diffused photo diodes 42, 44 and 46 on the document information receiving section receive radiant energy from the document. A barrier gate 48 receives input potential Vbar at a terminal 50. A storage gate bus 52 receives input potential Vstore at an input terminal 54. A transfer gate 56 in the exposure meter circuit 14 receives an input potential V×fer(e) at a terminal 58, and a transfer gate 60 in the document information receiving section receives an input potential V×fer(sr) at a terminal 62. A trigger bus 64 in the exposure meter circuit 14 is connected to an output terminal 65 which provides an output potential Vtrig indicative of the desired amount of illumination having been sensed by the exposure meter circuit 14. Buses 66, 68, 70 and 72 are $\phi1$, $\phi2$, $\phi3$ and $\phi4$ buses respectively for controlling the timing sequence of the shift registers for the document information receiving array 16. The operation of the exposure meter circuit 14 is to be described relative to FIGS. 3-5, with the document information receiving array 16 operating in a somewhat similar manner. It is seen that the blooming drain 34, blooming gate 38, barrier gate 48 and storage gate bus 52 are common to the exposure meter circuit 14 and the document information receiving section 16, whereas the transfer gates 56 and 60 are exclusive to the exposure meter circuit 14 and the array 16 respectively. This will be explained in more detail, with respect to FIGS. 3, 4 and 5.

Refer to FIGS. 3 and 5 which illustrate the operation of the exposure metering circuit 14. With respect to FIG. 5, the designations 3A-3D at the bottom of FIGS. 5 delineate the time periods corresponding to the time surface potentials illustrated in FIGS. 3A-3D, respectively, are occurring. Initially, all of the potentials applied to the respective terminals of the exposure meter circuit are zero, except for Vint which is applied to terminal 38, and which is slightly positive. This is seen with respect to FIG. 3A and FIG. 5B respectively. As shown in FIG. 3B, as Vdiff goes positive a potential well forms under the terminal 36, and as photo element 40 senses light from the reference indicia, the potential well thereunder having filled spills over into the potential well under terminal 36 as illustrated by the arrow 74. At this time, Vbar which is applied to terminal 50 is at zero, maintaining the charge transfer path thereunder closed, and the potentials applied to terminal 54, 58 and 65 are positive, with potential wells being formed under terminals 54 and 65 and a charge transfer path being formed under terminal 58. This may be seen with reference to FIGS. 5C, 5D, 5E and 5F respectively during the time interval 3B. When Vbar goes positive as illustrated at 76 in FIG. 5C, excess charge from the photo element 40 flows through the charge transfer path provided under the terminal 50 and flows into the potential well under terminal 54 as indicated by the arrow 78. As this potential well fills, as illustrated in FIG. 3D, charge begins to spill from the potential well under terminal 54 through the charge transfer path under terminal 58 to the potential well formed under the terminal 65 as indicated by the arrow 80. This corresponds to the time as illustrated at 82 in FIG. 5F. The accumulation of charge in the potential well under the terminal 65 causes the potential at terminal 65 to become increasingly more negative, until a given level is reached which is indicative of a predetermined amount of light being sensed by the exposure meter circuit 14, with a control signal being provided to the clock generator 24 via line 30 (FIG. 1) to indicate that the proper exposure has been sensed, with the clock generator 24 then terminating the Vbar pulse returning it to a zero level as indicated at point 86 in FIG. 5C, such that the light integration period ceases. With the cessation of light integration, Vtrig (FIG. 5F) is maintained at the level indicated at 84. A post-integration time period then occurs, such that the charge which is accumulated in the document information receiving array may then be processed through the associated shift registers to the utilization device 34 (FIG. 1). The light sensing process for determining exposure level then repeats as each following line at a time is sensed on the document.

Refer now to FIG. 4 which illustrates in more detail how the surface potential at terminal 65, Vtrig, is sensed for concurrently determining the light integration time of the exposure meter circuit 14 and the document imaging array 16. There is a first field effect transistor 88 which includes a source electrode 90 connected to terminal 65, a drain electrode 92 and a gate electrode 94. A second field effect transistor 96 includes a source electrode 98 connected to a source of potential Vd, a drain electrode 100 and a gate electrode 102 which is connected to the terminal 65 and the source electrode 90 of transistor 88. The drain electrode 100 of transistor 96 is connected to ground via a resistor 104 and to a negative input terminal 106 of a comparator 108. The positive input terminal 110 of the comparator 108 is connected to a moveable arm 112 of a potentiometer 114 which has one end thereof connected to ground and the other thereof connected to a source of potential Vd. The output 30 of the comparator 108 is connected to the clock generator 24 for providing an indication to the clock generator 24 that a light integration cycle should cease and Vbar should return to zero.

As illustrated in FIGS. 5H and 5I, at the beginning of the time period 3B, reset voltage at terminal 112 and reset gate voltage at terminal 114 are concurrently high for a short time interval. Accordingly, transistor 88 becomes conductive and the potential at terminal 112 is felt at terminal 65 and at the gate electrode 102 of the transistor 96. This positive potential renders the transistor 96 conductive and the source electrode 100, positive, and forms a potential well under the terminal 65, as previously set forth. With reference to FIG. 5F, as charge begins to spill into the potential well under the terminal 65, has described previously relative to FIG. 3D, the potential at terminal 65 then begins to become more negative as shown at point 82, with this negative potential being felt at the gate electrode 102 of the transistor 96, rendering the transistor less conductive. Accordingly, the potential felt at the negative input terminal 106 of the comparator 108 begins to become more negative, and is compared with the positive input applied to the terminal 110 thereof. When the potential at terminal 106 substantially equals that at the terminal 110, the comparator 108 provides a pulse indication on the output line 30 to the clock generator 24 indicating that sufficient background level has been sensed and the integration time period should stop. In response thereto, clock generator 24 returns the Vbar potential at terminal 50 to zero volts, as indicated at the point 86 in FIG. 5C, thereby closing the charged transfer path thereunder and ceasing the light integration until the next cycle. In the post integration time, a reset gate pulse 116 (FIG. 5I) is applied to the gate electrode 94 of transistor 88 via terminal 118 (FIG. 4), for applying the zero volt potential 118 (FIG. 5H) to the Vtrig electrode 65 via terminal 116, for returning Vtrig to a zero potential, as indicated at 120 (FIG. 5F). This returns the scanner array to the proper condition, prior to sensing the next line of the document. As previously stated, the clock generator 24 provides the respective potentials for the exposure metering circuit 14 and the document imaging array 16, including the $\phi 1-\phi 4$ timing pulses for the shift register of the imaging array.

Returning briefly to FIG. 2, it may be seen that the operation of the imaging array 16 is similar to that of the exposure meter circuit 14, with the exception being that the transfer gate voltage V×fer(sr) (FIG. 5G) applied to terminal 62 occurs in a different time frame than the transfer gate voltage V×fer(e) (FIG. 5E) applied to terminal 58 for the exposure meter circuit. Also, it is seen that in the imaging array 16, rather than there being a Vtrig electrode, there is the first $\phi 1$ bus 66, which has charge accumulated thereunder which is indicative of the image sensed, during the light integration time determined by Vbar, with $\phi 1$ then beginning the transfer of charge through the respective stages of the shift register for processing, and then application to the utilization device 34 (FIG. 1).

It is seen that the multigate structure illustrated offers several unique operational features for optical scanning systems. There is an ability to control the integration time after integration has started, since the barrier gate acts like a shutter in a camera under electronic control. Exposure is monitored from the beginning of the integration period, and when sufficient accumulated light has entered the exposure meter, as sensed by the comparator 108 (FIG. 4), the shutter closes, i.e., the barrier voltage Vbar is switched to a zero level to block the flow of charge between the photo diode and the storage site. The integrated charge in the storage region of a photo element in the imaging array 16 can then be held until the associated shift register is ready to accept a new line of data. Thus, the exposure meter circuit 14 is responsive to temporal changes in the light source, to the reflectivity of the paper, to the insertion of various filters in the optical path, to changes in lens apperture, etc. Another important consideration is that the on-chip exposure meter, fabricated at the same time as the imaging array, provides matched spectral response for color applications.

Having thus described my invention, what I claim as new, and desire to secure by Letters Patent is:

1. In a document scanner, the combination comprising:
    a scanner array including an exposure control section and a document information receiving section;
    means for concurrently imaging a reference indicia onto said exposure control section, and the document onto said document information receiving section; and
    means for controlling the amount of time said document information receiving section processes the imaged document as a function of the time said exposure control section senses the imaged reference indicia.

2. In a document scanner, the combination comprising:
    means for supporting a document:
    a reference indicia;
    means for imaging said reference indicia and said document into first and second optical paths, respectively;
    a scanner array including a first section in alignment with said first optical path for sensing the image from said reference indicia, and a second section in alignment with said second optical path for sensing the image from said document, with said first section controlling the time said second section senses the image from said document, in response to sensing a given amount of illumination from the image of said reference indicia.

3. The combination claimed in claim 2, wherein said means for illuminating comprises a fluorescent lamp.

4. The combination claimed in claim 3, wherein said scanner array comprises an array of charge transfer devices.

5. The combination claimed in claim 4, wherein said charge transfer devices comprise charge coupled devices.

6. The combination claimed in claim 2, including:
    a source of control signals, with a common control signal being applied to said first and second sections of said scanner array for permitting said sections to sense the image from said reference indicia and said document, with said control signal being terminated in response to said first section sensing said given amount of illumination from the image of said reference indicia.

7. The combination claimed in claim 5, wherein said reference indicia is formed on said means for supporting a document.

8. The combination claimed in claim 5, wherein said reference indicia forms a portion of said document.

9. In a document scanner, the combination comprising:
    means for supporting a document;
    a reference indicia formed on one of said document and said means for supporting;
    a fluorescent light source for concurrently illuminating said reference indicia and said document;
    means for concurrently imaging the reflection from said reference indicia and said document into first and second optical paths, respectively;
    a charge transfer device scanner array, including a first section in alignment with said first optical path for sensing the reflected image from said reference indicia, and a second section in alignment with said second optical path for sensing the reflected image from said document concurrent with said first section sensing said reference indicia, for a time determined by the provision of a common control signal; and
    means for providing said common control signal, with said common control signal being terminated in response to said first section sensing a given amount of illumination from the reflected image of said reference indicia.

10. The combination claimed in claim 9, wherein when said reference indicia is formed on said document, comprises an edge of said document where no characters are formed, and when said reference indicia is formed on said means for supporting, comprises a non-black stripe formed on one edge thereof, adjacent said document.

11. In a document scanner, apparatus which compensates for temporal illumination variations, comprising in combination:
    means for supporting a document;
    a reference indicia on one of said document and said means for supporting;
    a fluorescent light source for simultaneously illuminating at least a portion of said reference indicia and at least a portion of a line at a time of said document;
    means for simultaneously imaging the reflection from said reference indicia and said document into first and second optical paths, respectively;
    a charge transfer device scanner array, including an exposure control section in alignment with said first optical path for receiving the reflected image of said reference indicia, and a document information receiving section in alignment with said second optical path for receiving the reflected image of said document simultaneously with said exposure control section receiving the reflected image of said reference indicia, with the time said exposure control section and said document information receiving section process the respective reflected images being determined by a common control signal concurrently applied to each section;
    a comparator network having a first input to which a reference potential is applied, and a second input which receives a potential from said exposure control section which is indicative of the amount of illumination sensed by said exposure control section, with said comparator providing a comparison signal output when the magnitude of the potentials at said first and second inputs are substantially equal; and means for providing said common control signal, with said common control signal being terminated in response to the provision of said comparison signal.

12. The combination claimed in claim 10, wherein said charge transfer device scanner array said comparator network, and said means for providing a common control signal are formed on a single chip, with said exposure control section comprising a single multigate sensor element, and said document information receiving section comprising a plurality of multigate sensor elements.

* * * * *